United States Patent [19]

Jablonsky

[11] 4,028,996
[45] June 14, 1977

[54] ADJUSTABLE BYPASS VALVE TO EFFECT STEERING LIMITS IN BOOSTER POWER STEERING SYSTEM

[75] Inventor: Erich Jablonsky, Bobingen, Rems, Germany

[73] Assignee: Zahnradfabrik Friedrichshafen AG, Germany

[22] Filed: Jan. 12, 1976

[21] Appl. No.: 648,526

[30] Foreign Application Priority Data

Jan. 30, 1975 Germany .......................... 2503676

[52] U.S. Cl. .............................. 91/401; 92/165 R
[51] Int. Cl.² .......................................... F15B 15/22
[58] Field of Search ...................................... 91/401

[56] References Cited

UNITED STATES PATENTS

| | | | |
|---|---|---|---|
| 1,449,736 | 3/1923 | Degen | 91/401 |
| 2,394,384 | 2/1946 | Horstmann | 91/401 |
| 3,092,083 | 6/1963 | Sheppard | 91/401 |
| 3,608,433 | 9/1971 | Buisman et al. | 91/401 |

FOREIGN PATENTS OR APPLICATIONS 1,810,366  6/1970  Germany .............................. 91/401

*Primary Examiner*—Paul E. Maslousky
*Attorney, Agent, or Firm*—Zalkind & Shuster

[57] ABSTRACT

A bypass vavle arrangement extends fixedly from the end wall of a double acting cylinder through the radial wall of a booster piston with a sliding sealed fit to block bypass flow between the pressure chambers at opposed faces of the piston between desired limits of piston travel. Bypassing of such flow from one chamber to another effects a pressure drop from the pressurized chamber to the chamber being exhausted to limit the pressure driving force on the piston and thus effect a desired limit or extent of piston travel and of the connected steering mechanism. The invention provides for such bypass flow by means of flow passages spaced on opposite sides of a central valve body portion which passages are of a length to span the radial wall through which the valve body has passed when the piston has reached a certain point of its travel in either direction. A particular point of novelty resides in the adjustability of the bypass valve means so as to predetermine the point at which bypass effect takes place so that desired limits of travel of the piston are thus determined, such adjustment being made from the exterior of the cylinder at one end thereof. A further feature resides in the provision of a bushing having axial play through which the valve body passes and which bushing is pressure actuated to cut off bypass flow at either limit of piston travel so that rapid reversed direction steering under pressure can be effected with no need for manual force at the steering wheel to effect pressure build up.

5 Claims, 3 Drawing Figures

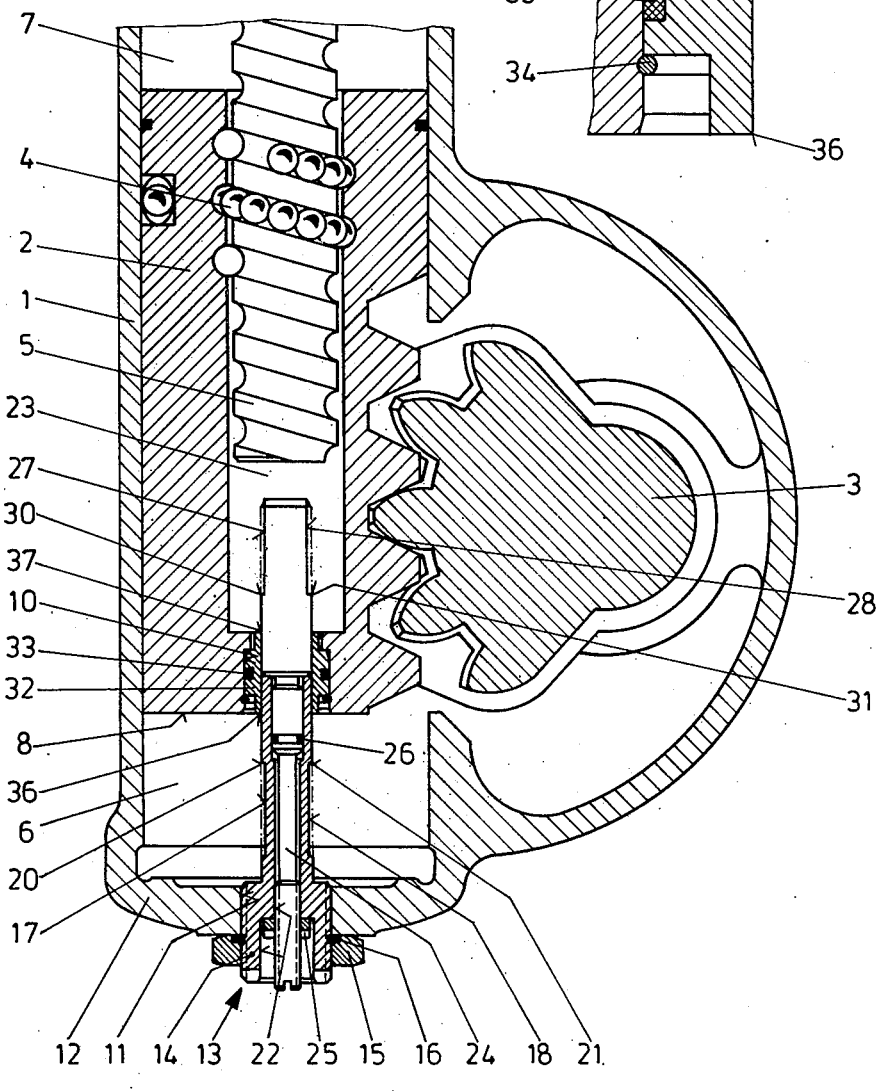
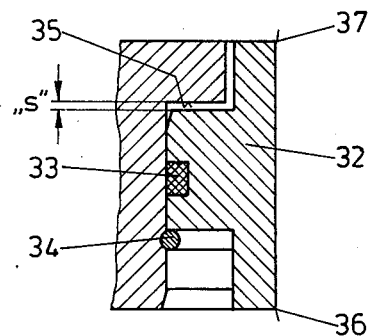

ADJUSTABLE BYPASS VALVE TO EFFECT STEERING LIMITS IN BOOSTER POWER STEERING SYSTEM

In the prior art there are known bypass systems for predetermining the travel of a booster steering piston. For example, German Pat. No. 1,104,837 provides such a bypass valve with adjustability but of complex design and relatively expensive contruction. More simple constructions are shown in German AS No. 1,655,942 and ATZ (1972) 4, page 153, illustration 17. However, these contructions are not adjustable from the exterior of the cylinder.

A further patent of the prior art is U.S. Pat. No. 3,092,083 which provides for adjustability at the exterior of the booster cylinder but requires elements such as ball valves in the piston. However, both ends of the cylinder must be accessible and in addition a certain amount of engineering is required for the ball valve arrangement which brings about its own complexity. In any event where valves are added such as in the U.S. Patent or in German AS No. 1,655,942, adjusting screws cannot be readily provided and the piston must be enlarged which is not feasible where a ball nut type of steering spindle is used.

The present invention overcomes all of these difficulties with a simple bypass valve means carried on the end wall of the booster cylinder and extending concentrically through the face or radial wall of the piston, the arrangement being such that exterior adjustment is readily accomplished by simple tools such as a screw driver or wrench, so that travel limitation can be controlled by rotation of threaded members from one end of the cylinder for either direction of travel of the piston. Provision is made for reversing the steering mechanism from one extreme position to the other very rapidly by means of a simple slidable bushing element in the end wall of the piston through which the valve body extends and which can be pressure actuated at the end of travel of the piston so as to cut off flow through the bypass flow passages. This permits quick booster pressure force acting on the piston and is of particular importance in parking a vehicle when rapid and full deflection of the wheels from one side to the other is required.

A detailed description of the invention now follows in conjunction with the appended drawing in which:

FIG. 1 is a longitudinal cross section showing the essential components;

FIG. 2 is a fragmentary cross section, to an enlarged scale, of certain components shown in FIG. 1;

Figure 3:
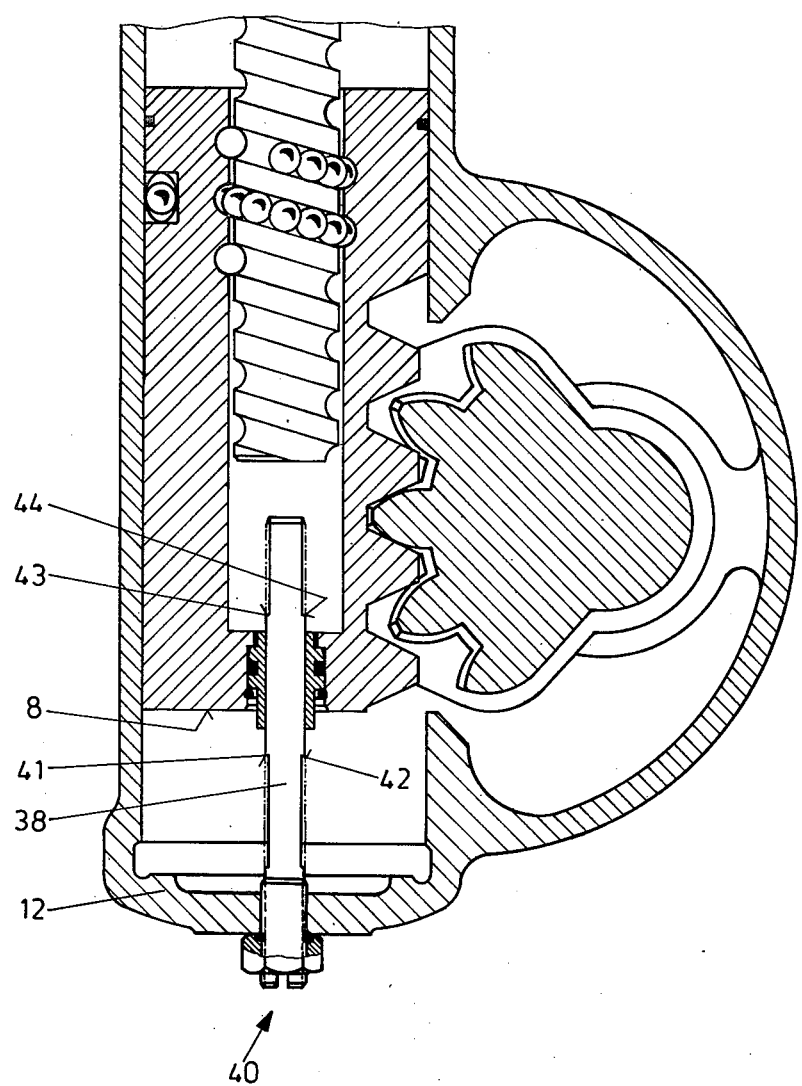
FIG. 3 is a longitudinal cross section showing a modification of the invention.

Now referring to FIG. 1, a double acting booster cylinder 1 is illustrated having the power piston 2 co-acting with the gear sector shaft 3 and provided with the usual ball nut 4 operated by threaded steering spindle 5, all of which is conventional.

The piston divides the cylinder into the pressure chambers 6 and 7 and it will be understood that conventional hydraulic pressure control means are provided so that by turning a steering wheel (not shown) operation of spindle 5 occurs to control valving (not shown) for pressure feed to one chamber or the other, the opposite chamber being at that time communicated to exhaust, likewise conventional.

Thus, the piston 2 is shifted for booster steering purposes in the usual manner whereby mechanical force to drive gear sector 3 is provided for actuating a steering linkage (not shown), all well known in the art.

The radial end wall 8 of the piston, i.e., the piston face or top, has a bore 10 which in conjunction with a bore 11 in the end wall 12 of the cylinder effects concentric accommodation of a bypass valve means 13. Bore 11 is provided with a thread into which a valve body 14 is screwed and which is maintained in fixed position by means of jam nut 15, the arrangement being sealed by gasket 16. The portion of the cylindrical valve body 14 which projects into pressure chamber 6 is provided with a pair of opposed flow passages, such as flats 17 and 18, having flow cut off edges 20 and 21, respectively. These flow passages could, of course, be grooves as well as machined flats effecting recesses.

The screw portion of valve body 14 has a stepped bore 22 provided with a thread in the narrow part of the bore into which an additional cylindrical valve body 24 has been screwed and such additional body extends concentrically entirely through the valve body 14 and into the hollow interior chamber 23 of the piston communicating with pressure chamber 7. A jam nut 25 fixes valve body 24 in bore 22 and the valve body 24 has flats 27 and 28 with flow control cut-off edges 30 and 31 within the bore 23, as shown. It will likewise be apparent that the flats 27 and 28 could be grooves, slits, bores, or equivalents.

Flats 30 and 31 constitute flow passages similar to those effected by the flats 17 and 18 and it will be noted that the axial length of all such flats is in excess of the length of a bushing 32 which is carried in the wall 8 of the piston. Depending upon one extreme position or the other of the piston, communication between the chambers 6 and 7 is effected by one pair of flats or the other whereby a bypass function occurs between a pressurized chamber and a chamber being exhausted. The length of the intermediate body portions of the valves 14 and 24 is such as to normally block flow between the chamber 6 and 7, as will be apparent, until the piston has moved to establish the bypass flow connection at one end or the other of its travel.

The bushing 32 is sealed by means of a gasket 33 in the wall 8 of the piston and the design is such that the bushing can have a certain amount of rocking movement to take care of inaccuracy of manufacture or wear between the composite valve bodies and the piston so that there will be no resistance to any easy slide fit as the piston rides up and down in the cylinder.

An important feature which should be particularly noted in conjucntion with FIG. 2 is the gap or space S between the collar of bushing 32 and the abutting annular shoulder 35 provided in the end wall of the piston. Thus, bushing 32 has a slight amount of axial play with respect to a stop ring 34 carried annularly in the wall of bore 10, the degree of play being determined by the spacing S. The dimensioning is such that the edges of bushing 32 form flow cut-off edges which coact with the flow control edges of the flow passages in the valve bodies. Thus, the annular edges 36 and 37 of bushing 32 coact respectively with the flow control edges 30 or 31, respectively, or 20 and 21, respectively, of the respective valve bodies 24 and 14 depending on whether the piston is moving upwardly or downwardly. In other words, bypass flow between the pressure chambers in either position of the piston is dependent upon movement of the various slidable and fixed edges with respect to each other so as to open a clear passageway through bushing 32 wherein flow passages span wall 8, or in this case, bushing 32 which has the same axial length as bore 10 in which it fits. It will be apparent that the bushing need not be the same axial length of bore 10, but for simplicity of expression it will be understood that description in the specification and claims concerning spanning of the wall 8 by the flow passages refers to the flow passage recesses connecting the pressure chambers to drop the pressure in a pressurized chamber, regardless of the pressure, absence, or length of bushing 32.

Likewise, for simplicity of description, the bore 23 will be understood to be a portion of pressure chamber 7 since it obviously serves the purpose.

In operation, with the piston moving downwardly as seen in FIG. 1 with pressure chamber 7 pressurized, bushing 32 is likewise pressurized due to the pressure in hollow interior 23 of the piston communicating with pressure chamber 7. Bushing 32 thus moves downwardly to the full extent of its limit as seen in FIG. 2, abutting stop ring 34, at which time the bushing edge 37 has moved below the valve flow control edges 20 and 21 of the flow passages 17 and 18, respectively. At this time the piston is at a lowermost position, or substantially so, predetermined by the length of the valve body portion comprised of the bodies of valves 14 and 24. That is to say, the bushing 32 must traverse that portion of the length of the composite valve body portion, which length is predetermined in relation to the axial length of bushing 32, until a flow gap is opened at the edges 37, 20 and 21. At this point there is communication from the high pressure to the low pressure side of the piston through the piston wall, i.e., through the bushing 32, by virtue of flow passages 17 and 21. This will be apparent by visualizing piston 2 in a downward position, so that the flow passages 17 and 18 straddle, by virtue of their length, the axial length of the busing 32.

Accordingly, the pressurized chamber 7 being connected to the exhausting chamber 6 is rapidly dropped in pressure and booster steering action ceases. Under circumstances of opposite steering actuation, precisely the opposite effect takes place in the chamber 6 is pressurized thus raising piston 2 to the point where the flow passage edges 30 and 31 are below the bushing edge 36. At this time, the pressure chambers are in communication via flow passages 27 and 28 and the pressure in chamber 6 is dropped by virtue of being connected to chamber 7 which is under exhaust pressure.

As noted above, an important feature of the invention resides in the provision of the spacing S so that the bushing 32 can shift axially in either direction to the extent provides by such spacing. Thus, if at the desired end of travel of the piston quick steering reversal is required, there would ordinarily be no operating pressure at that moment since both pressure chambers are connected to exhaust pressure. It would under such circumstances be necessary to shift piston 2 by manual force to effect a closure of whichever pair of flow passages happens to be open, dependent upon the position of piston 2. This is avoided by the axial play provided for bushing 32 by virtue of the spacing S.

For example, if the piston 2 happens to be in a downward position, it is in such position because pressure chamber 7 has been pressurized and bushing 32 will be in abutment with stop ring 34. If, however, opposite direction steering is desired at once, hydraulic pressure oil is directed to pressure chamber 6 which acts to move the bushing 32 upwardly against shoulder 35 whereby edges 37, 20 and 21 coact to interrupt flow passage between the pressure chambers. The same effect is had, that is, pressure movement of bushing 32 were piston 2 to be in the upper position. Accordingly, rapid steering reversal is achieved.

A further important feature of the invention is the fact that by bypass function and piston travel limits are adjustable by means of the threaded connections which hold the bypass valves together with the cylinder wall end. Thus, it is apparent that either valve 14 or 24, or both, can be moved axially to vary the point at which bypass flow occurs thereby predetermining the limit of travel of the piston in either direction. That is to say, the control edges 20 and 21 are shiftable up or down, as viewed in FIG. 1, as are the control edges 30 or 31. It may be noted that in the relative positions of the valve bodies as shown in FIG. 1, the valve body 24 can, by means of a screwdriver or other simple tool, be exteriorly adjusted only upwardly since it is in abutment with the upper rim of the valve body 14 within bushing 32. However, it will be apparent that adjustments or either of the valve bodies for bidirectional piston travel limits may be made for a suitable range for all practical purposes exteriorly of the cylinder and at a single end.

The modification of FIG. 3 shows a simplified construction wherein a single bypass valve means 40 having the valve body 38 provided with flow passages terminating in cut-off edges 41 and 42 at one end of the valve body and with cut-off edges 43 and 44 at the other end. Similar parts as heretofore described in FIGS. 1 and 2 are the same and such description need not be repeated.

It will be apparent that in function, the bypass between pressure chambers at either end of travel of the piston is virtually the same as heretofore described, cut-off in either direction by coaction with the respective cut-off edges of the bushing being clearly understandable. External adjustment of valve body 38 and to control limits of travel of the piston may be had by the threaded arrangement of the valve body 38 at the cylinder end wall 12 in an obvious manner following the teaching of FIG. 1.

What is claimed is:
1. In a booster steering device having
   a double acting cylinder with opposed pressure chambers divided by a reciprocal piston comprising a wall with faces exposed to pressure in respective chambers whereby said piston may be directionally actuated by pressurizing of one chamber and exhausting the other chamber for steering a vehicle, the improvement comprising:
   bypass valve means secured to said cylinder and passing slidably and sealingly through said piston wall to block flow between said pressure chambers when said piston is intermediate limits of piston travel;
   said bypass valve means having flow passages disposed on opposite sides of said piston wall when said piston is intermediate limits of piston travel and said flow passages being then exposed to pressure only in respective pressure chambers; and flow passages being of a length to span between said pressure chambers through said piston wall to effect flow between said pressure chambers at respective limiting positions of said piston to bypass pressure from a pressurized chamber to a chamber being exhausted to drop booster pressure in a pressurized chamber thus determining limiting positions of said piston;

said bypass valve means comprising an elongated body;

a bushing through the wall of piston and carried thereby and said elongated body passing through said bushing;

means permitting axial play of said bushing in said wall within limiting positions;

said flow passages being of a length to span said bushing between chambers to effect bypass flow;

said bushing and flow passages having respective cut-off edges coacting by relative movement for cut-off of bypass flow between chambers upon pressure actuation of said bushing within said axial play limiting positions whereby when either chamber is pressurized at a limiting position of said piston actuating booster pressure for reverse travel of side piston is effected.

2. In a booster steering device as set forth in claim 1: said bushing having sealing means in passing through said wall.

3. In a booster steering device as set forth in claim 1: said bushing having sealing means in passing through said wall and being provided with oscillatory play to compensate for misalignment of said cylinder and said elongated body of said valve means.

4. In a booster steering device having
a double acting cylinder with opposed pressure chambers divided by a reciprocal piston comprising a wall with faces exposed to pressure in respective chambers whereby said piston may be directionally actuated by pressurizing of one chamber and exhausting the other chamber for steering a vehicle, the improvement comprising:

bypass valve means secured to said cylinder and passing slidably and sealingly through said piston wall to block flow between said pressure chambers when said piston is intermediate limits of piston travel;

said bypass valve means having flow passages disposed on opposite sides of said piston wall when said piston is intermediate limits of piston travel and said flow passages being then exposed to pressure only in respective pressure chambers; and flow passages being of a length to span between said pressure through chambers through said piston wall to effect flow between said pressure chambers at respective limiting positions of said piston to bypass pressure from a pressurized chamber to a chamber being exhausted to drop booster pressure in a pressurized chamber thus determining. limiting positions of said piston;

said bypass valve means comprising a valve body effected by two valve members secured to each other and elongatedly extending through said piston wall;

each of said valve members having respective flow passages comprising recesses in the sides thereof of a length to span said piston wall for effecting flow between pressure chambers;

one said valve body being carried by the other said valve body and telescopically related thereto and adjusting means to effect fixed positions of said valves bodies relative to each other;

the other said valve body being telescopically carried by an end wall of said cylinder and adjusting means for adjusting said other valve body to fixed telescoped positions with respect to said end wall;

both said adjusting means being disposed externally of said cylinder.

5. In a booster steering device having p1 double acting cylinder with opposed pressure chambers divided by a reciprocal piston comprising a wall with faces exposed to pressure in respective chambers whereby said piston may be directionally actuated by pressurizing of one chamber and exhausting the other chamber for steering a vehicle, the improvement comprising:

bypass valve means secured to said cylinder and passing slidably and sealingly through said piston wall to block flow between said pressure chambers when said piston is intermediate limits of piston travel;

said bypass valve means having flow passages disposed on opposite sides of said piston wall when said piston is intermediate limits of piston travel and said flow passages being then exposed to pressure only in respective pressure chambers;

said flow passages being of a length to span between said pressure chambers through said piston wall to effect flow between said pressure chambers at respective limiting positions of said piston to bypass pressure from a pressurized chamber to a chamber being exhausted to drop booster pressure in a pressurized chamber thus determining limiting positions of said piston;

said bypass valve means comprising a valve body;

mounting means for mounting said valve body to an end wall of said cylinder and extending therethrough for external access;

said mounting means having an adjustable threaded connection with said end wall of said cylinder for varying the axial position of said valve body relative the travel path of said piston to predetermine the positions of said flow passages in said cylinder for determining said limiting positions;

said valve body comprising two concentric valve members each having at least one of said flow passage for a respective pressure chamber;

one said valve member having a bore internally threaded to receive the other said valve member and having said threaded connection with said end wall of said cylinder;

said other valve member having an outer end externally accessible of said cylinder by virtue of said bore in said one valve member for axial adjustment relative to said one valve member;

whereby said flow passages may be varied in axial position relative the path of travel of said piston.

* * * * *